United States Patent [19]  [11]  3,994,589
Nodwell et al.  [45] Nov. 30, 1976

[54] APPARATUS FOR DETERMINING THE POSITION OF A SURFACE

[75] Inventors: Roy A. Nodwell, West Vancouver; Steven L. F. Richards, Vancouver, both of Canada

[73] Assignee: Canadian Patents and Development Limited, Ottawa, Canada

[22] Filed: Apr. 30, 1975

[21] Appl. No.: 573,248

[52] U.S. Cl. .............................. 356/156; 250/237 R
[51] Int. Cl.² .......................................... G01B 11/00
[58] Field of Search ................ 250/237 R; 356/156, 356/159

[56] References Cited
UNITED STATES PATENTS

| | | | |
|---|---|---|---|
| 3,016,464 | 1/1962 | Bailey | 356/156 |
| 3,187,185 | 6/1965 | Milnes | 356/156 |
| 3,565,531 | 2/1971 | Kane et al. | 356/156 |
| 3,667,846 | 6/1972 | Nater et al. | 356/156 |
| 3,671,726 | 6/1972 | Kerr | 356/156 |
| 3,749,500 | 7/1973 | Carlson et al. | 356/156 |

Primary Examiner—John K. Corbin
Assistant Examiner—Richard A. Rosenberger
Attorney, Agent, or Firm—Edward Rymek

[57]  ABSTRACT

This invention is directed to an electro-optical apparatus for determining the position of an opaque surface without contact with the surface. It includes a light beam system which projects a well defined beam having a rectangular cross-section, obliquely onto the surface such that any movement of the surface in the perpendicular direction will result in a displacement of the illuminated area on the surface, and a detector which converts this displacement into a proportional light intensity. The detector has a field stop with an aperture of specific shape onto which the illuminated area is imaged such that only a portion of the image will pass through the aperture depending on the displacement of the illuminated area. A photosensitive device is used to measure the light intensity passing through the aperture. Embodiments of apparatus for normalizing the output for greater precision are described as well as a system for measuring the thickness of an object by determining the position of two opposite surfaces of the object.

4 Claims, 7 Drawing Figures

APPARATUS FOR DETERMINING THE POSITION OF A SURFACE

This invention is directed to an apparatus for the non-contact measurement of the thickness of an object and in particular to an electro-optical apparatus for determining the relative position of an opaque surface.

In many instances, it is necessary to continuously measure the thickness of a product which is moving along its longitudinal axis without imposing any mechanical constraint on that product. This is desired in the production of forestry products such as particle board and paper, or in the production of sheet metals or plastics. U.S. Pat. Nos. 3,536,405 and 3,565,531 are examples of electro-optical apparati which have been developed for such a purpose. In U.S. Pat. No. 3,536,405 to Flower, light beams are scanned across opposite surfaces of the object and the reflected beams are converted to electrical pulses whose relative times of occurence are a measure of the thickness of the object. In U.S. Pat. No. 3,565,531 to Kane et al, radiant energy is directed to each side of the object and the centroid of energy reflected from each side is tracked by detector elements which produce output signals that are processed to provide a signal representative of the thickness of the object.

It is therefore an object of this invention to provide an improved apparatus for detemining the relative position of an opaque surface.

It is further object of this invention to provide an apparatus for continuously determining the relative position of an opaque surface in a direction perpendicular to that surface.

It is another object of this invention to provide an electro-optical apparatus for determining the relative position of an opaque surface by translating the position of the opaque surface into an optical intensity.

It is a further object of this invention to provide an electro-optical apparatus for measuring the thickness of an object by determining the position of one surface of the object relative to the opposite surface of the object.

These and other objects are achieved in an electro-optical apparatus for determining the position of an opaque surface having a fixed light beam means to project a beam of light obliquely incident upon the surface illuminating an area having a specific shape, such that any movement of the surface in the perpendicular direction will result in a displacement of the illuminated area on the surface. The apparatus further includes a detector means having a field stop with an aperture of specific shape upon which the illuminated area is imaged and a photosensitive device which provides an output related to the intensity of the light passing through the field stop, this light intensity being proportional to the position of the opaque surface.

The thickness of an object is measured by determining the relative positions of the two opposite surfaces of the object by means of two position determining apparati.

The apparatus may further include a means for detecting the total light intensity of the illuminated area on the opaque surface, the output of which is used to normalize the output of the detector means.

Figure 1:
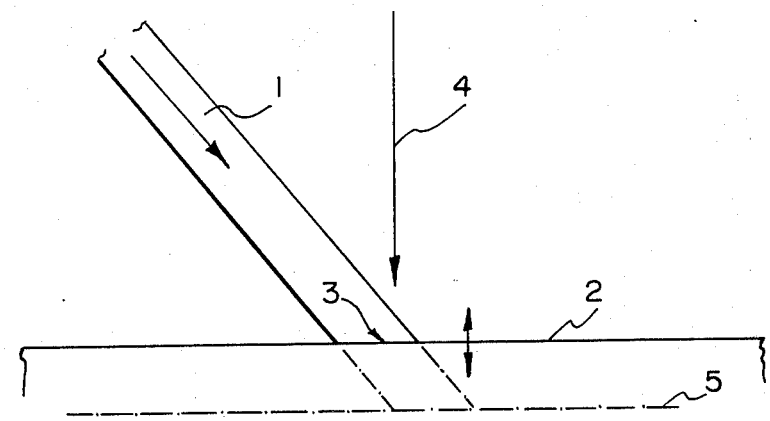
FIG. 1 is a schematic of the side view of a light beam obliquely incident on an opaque surface.
Figure 2:
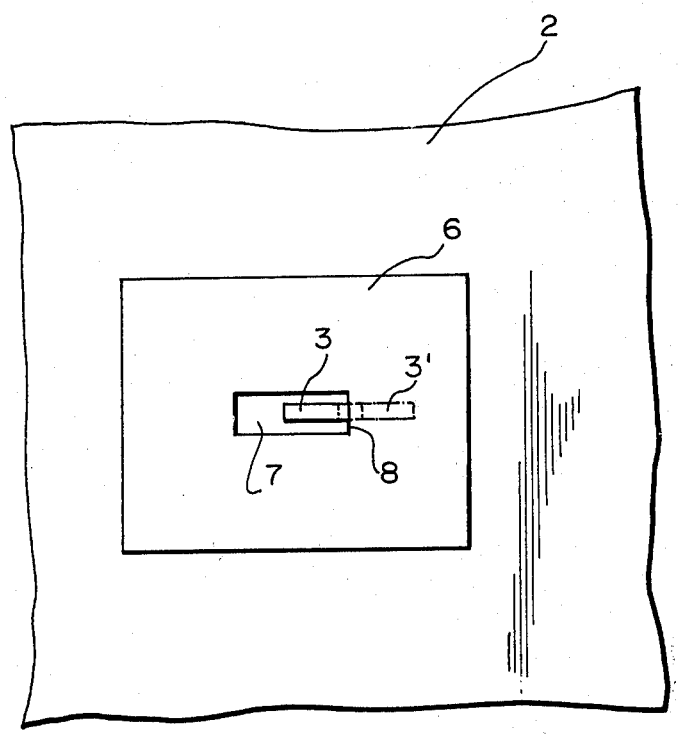
FIG. 2 is a top view of the illuminated area on the surface as seen from behind a field stop.

The basic principle of the present invention is shown in FIGS. 1 and 2. A beam of light 1 having some predetermined cross-section such as rectangular, may be projected obliquely upon a surface 2 and the resultant illuminated surface area 3 may be viewed along an axis 4 perpendicular to the surface. As the surface moves in one direction or the other along this axis of observation, the illuminated area will be displaced along the surface. As shown, when the surface moves to a position 5, the beam 1 will strike the surface 2 to illuminate a displaced surface area 3'. Thus a movement of the surface 2 along the axis of observation results in a desplacement of the illuminated area in a direction along the surface 2 transverse to the axis of observation.

The illuminated area 3 may be imaged onto an aperture 7 with the imaged area 3 straddling one edge 8 of the aperture 7, as shown in FIG. 2. With a photosensitive device (not shown) located so as to provide an output signal proportional to the intensity of the light passing through the field stop aperture 7, a displacement of the illuminated surface area 3 will change the intensity of the light passing through the field stop aperture and the photosensitive device will provide an output porportional to the relative position of the surface 2 along the observation axis 4.

Figure 3:
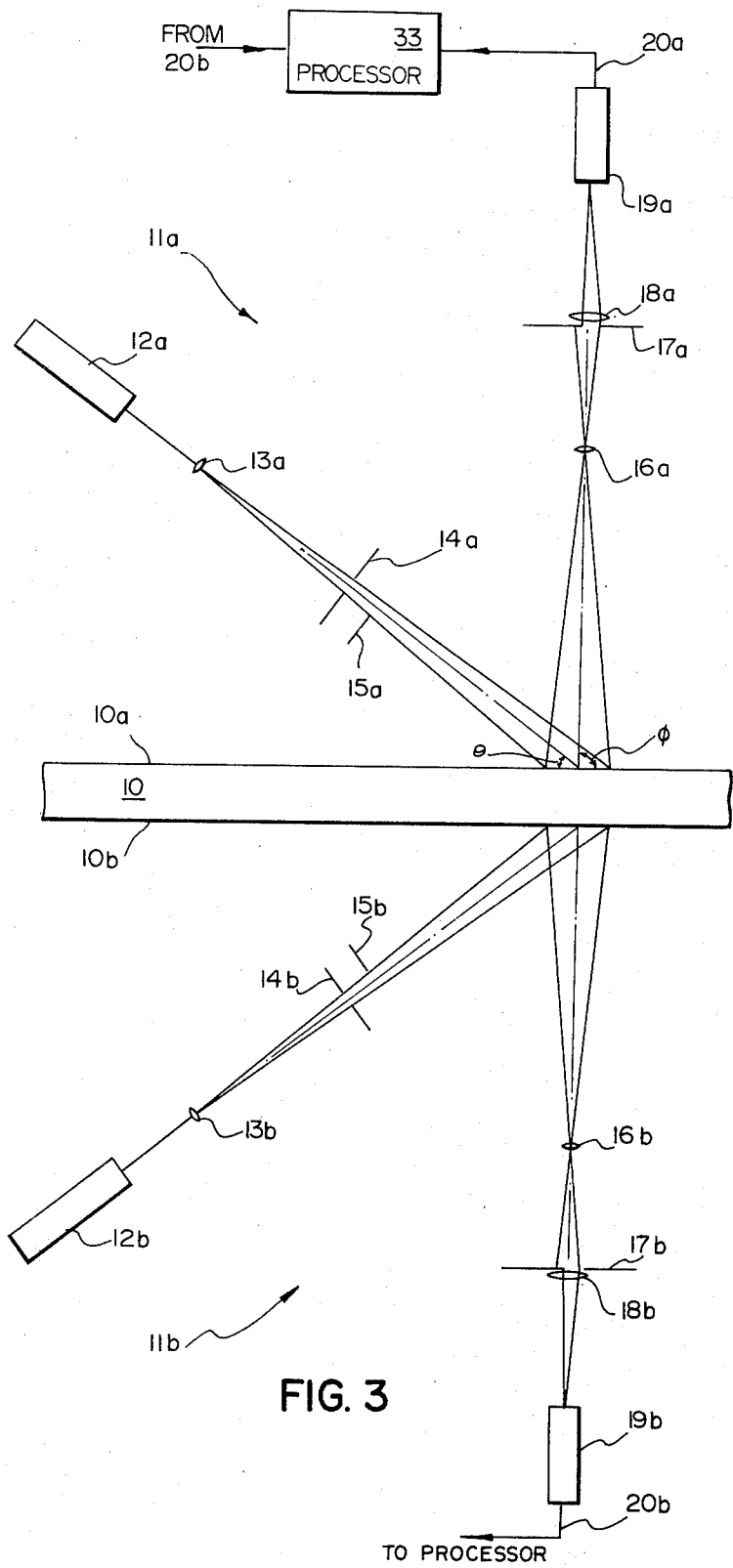
FIG. 3 is a schematic of a thickness measuring system.

In order to continuously measure the thickness of an object 10, such as particle board, metal sheets or the like, whether it is stationary or in movement, the system shown in FIG. 3 is preferred. This system consists of a first surface position determining apparatus 11a which determines the position of a surface 10a, a second surface position determining apparatus 11b which determines the position of the opposite surface 10b of the object 10, and a device 33 for processing the output signals from apparati 11a and 11b to compute the thickness of the object 10.

Figure 4:
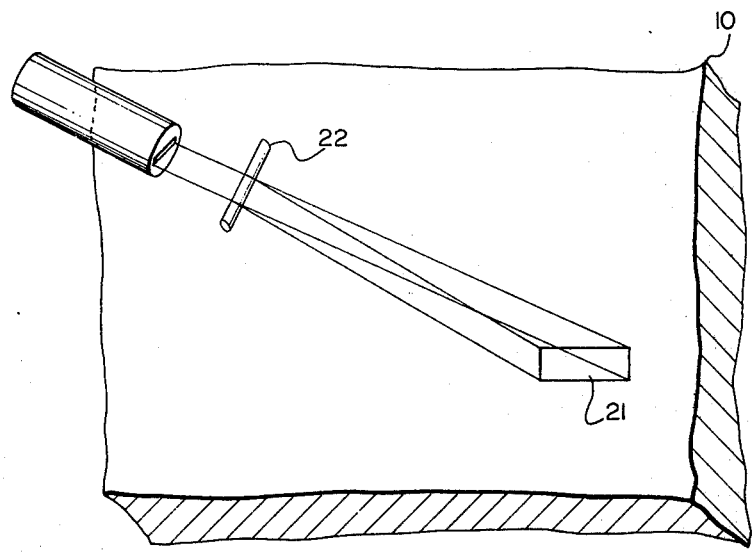
FIG. 4 is a schematic of a light source means.

In FIG. 3, surface position determining apparati 11a and 11b are identical and therefore only apparatus 11a will be described in detail. The light source 12a projects a light beam through a lens 13a obliquely onto the surface 10a. The desired angle of incidence $\Theta$ at which the beam strickes the surface 10a will vary for different applications. The smaller the angle $\Theta$, the greater the sensitivity of the instrument since the displacement of the illuminated area on the surface 10a will be large for small changes in position of the surface 10a along the observation axis. On the other hand, when the angle $\Theta$ is large, large changes in position of the surface 10a along the observation axis will produce a relatively small displacement of the illuminated surface. The apparatus 11a may therefore be constructed having a fixed angel $\Theta$ for specific applications or having a variable angle $\Theta$ for general applications. The desired light beam is generated and shaped by a light source 12a, a lens 13a and shaping shutters 14a and 15a. The light source 12a may be any conventional source, however, a laser has been found to be convenient as it provides a well defined intense beam. The lens 13a is used to produce a light beam of desired cross-section which can be assumed to illuminate a constant area on the surface 10a for any movement in that surface, due to the distance between lens 13a and surface 10a. To produce a near linear response in the apparatus, a beam having a rectangular cross-section 21, as shown in FIG. 4, may be produced by using a cylindrical lens 22. However, alternative beam cross-sections may be used to derive any desired linear or non-linear variation of intensity with position. A non-linear function could provide increased accuracy over a portion of the total range of measurement, or a sudden change in intensity when the surface position exceeded preset limits. Further, beam shaping shutters 14a and 15a are used to ensure that the rectangular beam cross-section has well defined ends. In addition, the light beam source 12b output may be modulated at some predetermined frequency, such as 10kHz, such that it may be distinguished from ambient illumination by means of a filter in the electronic processor to be described further with respect to FIG. 7.

Apparatus 11a further includes a device for detecting the location of the illuminated area on the opaque surface which in its simplest form includes a lens 16a which images the diffused reflection of the illuminated area onto a field stop 17a of the type described with respect to FIG. 2. A further lens 18a located immediately behind the field stop 17a images the light passing through the field stop 17a onto the surface of a photosensitive device 19a, such as a photocell. The photocell 19a provides an output signal on terminal 20a which is proportional to the intensity of the light sensed and which is therefore representative of the relative position of the surface 10a. Lens 18a ensures that light which has passed through the field stop always falls on the same region of the sensitive area of the photocell irrespective of the position of the surface. This eliminates errors introduced by sensitivity variations across the photocell surface. The optical axis of the detector, elements 16a, 17a, 18a and 19a would usually be perpendicular to the plane of the surface. However, for certain types of surface such as flat surfaces, it may be desirable to incline the optical axis at an angle $\Theta$ to the surface 10a in order to make use of the specular reflection from the surface, without affecting the principle of operation of the device.

In order to overcome any possible spurious measurements which might be caused by any variation of the reflectivity of the surface 10a or of the intensity of the light source 12a, the total intensity of the light intensity of the total illuminated area on the surface 10a may be measured and used to normalize the output signal from the photosensitive device 19a. Various apparatus may be employed to measure the light intensity of the total illuminated area, two embodiments of which are shown in FIGS. 5 and 6.

Figure 5:
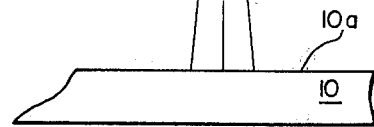
FIG. 5 is a schematic of one embodiment of a total light intensity detector.

In FIG. 5 a partially reflecting mirror 23a is located behind lens 16a, and the light reflected from mirror 23a is focussed onto a photosensitive device 25a by a lens 24a. An output is thus provided on terminal 26a which is proportional to the total light intensity of the illuminated area on the surface 10a. This output may be used to normalize the output of photosensitive device 19a shown in FIG. 3.

Figure 6:
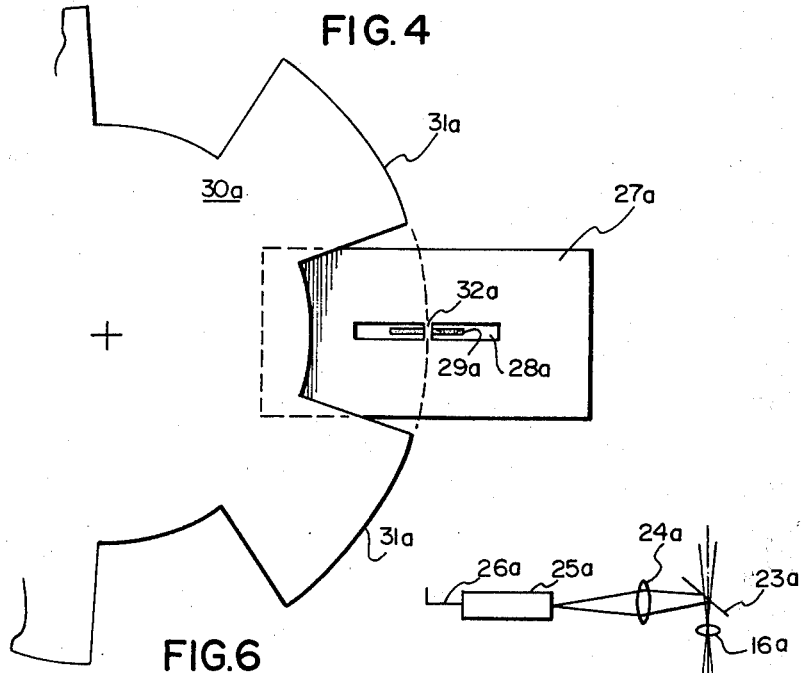
FIG. 6 is a schematic of a second embodiment of a total light intensity detector.

In FIG. 6, the field stop 17a shown in FIG. 3 is replaced by a field stop 27a which has an aperture 28a sufficiently large to allow the unobstructed passage of the image 29a of the illuminated area, and a chopper wheel 30a rotated by a motor (not shown). The outer edges 31a of the chopper wheel 30a perform the function of edge 8 of aperture 7 (FIG. 2) and as the chopper wheel 30a rotates, the image 29a of the illuminated area is alternately passed unobstructed and partially masked through the field stop 27a. The photosensitive device 19a (FIG. 3) thus alternately provides a first output proportional to the total intensity of the image 29a when unobstructed and a second lower output proportional to the position of the surface 10a (FIG. 3) when partially masked, the second output may be normalized using the first output.

A problem which may be encountered using the apparatus in FIG. 6 is play in the motor bearings leading to an ill defined field stop edge. This may be overcome by obscuring a section 32a of the field stop aperture 28a immediately behind the outer edge 31a of the chopping wheel 30a. This will have no effect on the accuracy of the instrument provided the image 29a always straddles the obscured section 32a.

Figure 7:
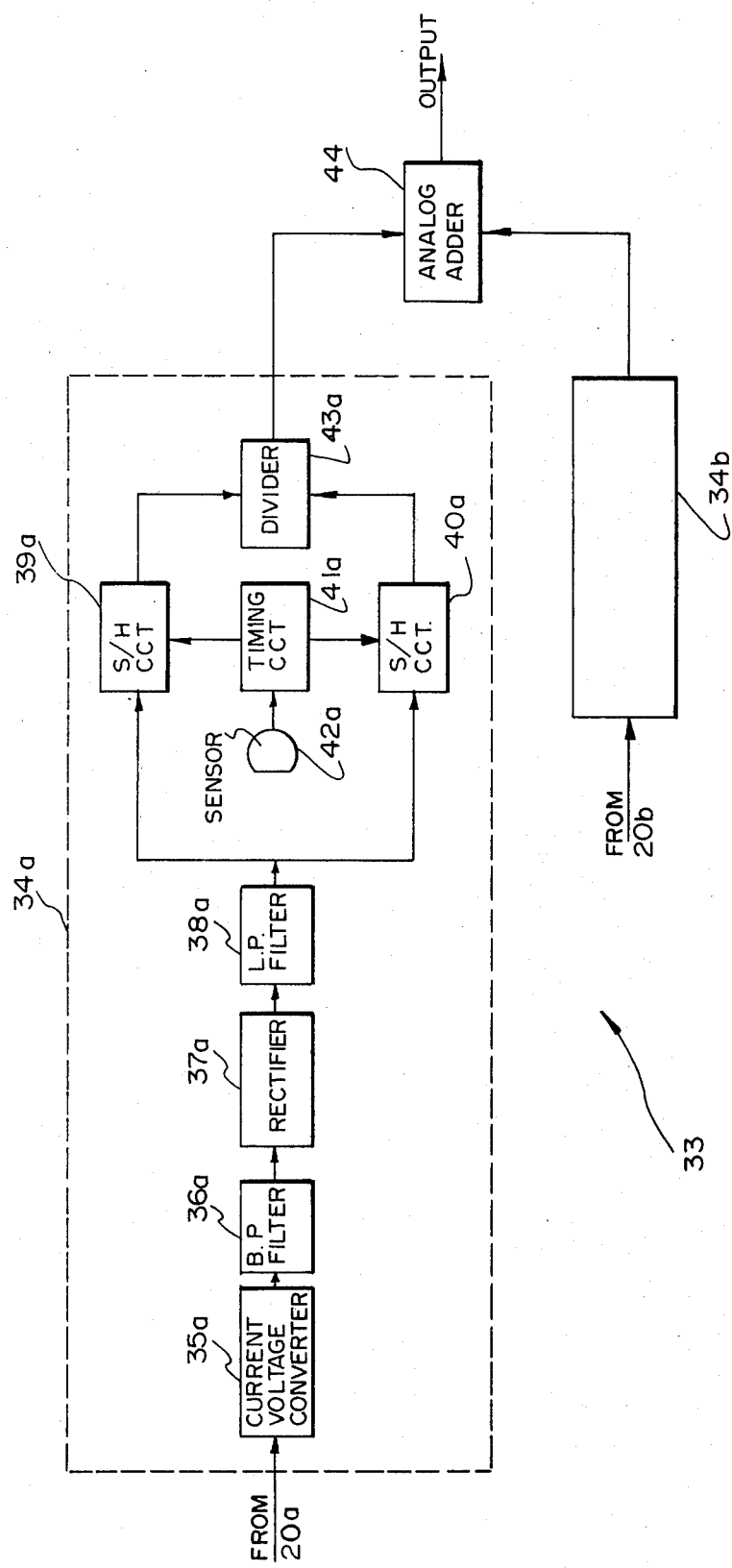
FIG. 7 is a schematic of a signal processor circuit.

As discussed previously, apparatus 11a in FIG. 3 will determine the relative position of a surface 10a. To measure the thickness of an object, one such device may be used if the opposite surface 10b position is fixed. However, for greater precision since most objects will be in movement along the observation axis, especially if they are being measured while being transported in the direction of their longitudinal axis, it is preferred to determine the positions of the opposite surfaces 10a and 10b using two apparati 11a and 11b and combining the outputs on terminals 20a and 20b in an electronic processor 33 to provide a measure of the thickness of object 10. The presentation of the measurement is flexible and will be dictated by the user's requirements. In the case of the embodiment shown in FIG. 3 including the arrangement of FIG. 6, a processor 33 which may be used is shown in FIG. 7. Processor 33 includes a a first circuit 34a for processing the output signal from photosensitive cell 20a and a second identical circuit 34b for processing the output signal from photosensitive cell 20b. The output current from cell 20a is first converted into a voltage by a current to voltage converter 35a; this signal is then put through a bandpass filter 36a tuned to the modulation frequency of the light source 10a, in order to eliminate the signal component due to ambient illumination. The signal is then rectified by rectifier 37a and passed through a low pass filter 38a to eliminate any remaining modulation. The filter 38a is connected to two parallel connected sample and hold circuits 39a and 40a. Pulses from a timing circuit 41a, under the control of a chopping wheel sensor 42a, separate the surface position signal (partial area intensity) from the normalizing signal (total area intensity). These two signals are then fed to an analog divider 43a, which provides a DC voltage output proportional to the position of the surface. The output from cell 20b is processed in an indentical fashion in circuit 34b, and the two resultant DC voltages are added in an analog adder 44 to give a voltage proportional to the thickness of the object. This output may be digitized, and the resultant information used in computations of, for example, the maximum, minimum and average thickness of each object 10 in a production batch. Alternatively, the digitized output may be fed directly to a computer for on line process control.

The accuracy of the measurement of the position of the surface is closely linked to the range over which the measurement may be made, as discussed previously with regard to the light beam angle of incidence on the surface. In a typical application, the measurement of the thickness of particle board on a production line, measurement over a range of 1 inch with an accuracy of ± 0.005 inch is required. Reduction of the range of measurement to 0.1 inch (e.g. sheet metal or paper production) enables an accuracy of ± 0.005 inch to be realized. A further advantage of the apparatus in accordance with this invention is that it is largely independent of surface texture, the 'average' position of a rough surface being measured. It is, however, desirable that the surface roughness should be less than two or three times the accuracy of the measurement.

Another advantage of the apparatus is that it is capable of monitoring the thickness of a moving object which has a continuously varying thickness. However, in the chopping wheel method of normalizing the beam intensity as described above with respect to FIG. 6, the time scale of the thickness variation must be longer than the period of the chopping wheel.

We claim:

1. Apparatus for determining the position of an opaque surface comprising:
    means for providing a light beam having a predetermined cross-section and for projecting the beam obliquely onto the opaque surface such that any movement of said surface in a perpendicular direction will result in the displacement of the illuminated area on the surface;
    field stop means having an aperture of predetermined shape;
    photosensitive means for providing an output signal proportional to impinging light intensity;
    imaging means for imaging the total illuminated area through said aperture onto said photosensitive means; and
    chopper means positioned adjacent said field stop means for cyclically obstructing a portion of said aperture such that the output signal of said photosensitive means is a function of the displacement of the illuminated area on the opaque surface.

2. Apparatus as claimed in claim 1 wherein said light beam means comprises:
    light source means for providing a light beam; and
    cylindrical lens means for providing a rectangular cross-section to said light beam.

3. Apparatus as claimed in claim 2 wherein the aperture in said field stop is rectangular.

4. Apparatus as claimed in claim 3 wherein said chopper means includes a chopper wheel and motor means for rotating said chopper wheel; and wherein said aperture includes an opaque strip immediately adjacent the outer edge of said chopper wheel.

* * * * *